(12) United States Patent
Kim et al.

(10) Patent No.: US 9,746,750 B2
(45) Date of Patent: Aug. 29, 2017

(54) OPTICAL LOGIC GATES AND METHOD FOR GENERATING LOGIC SIGNALS USING DNA-BASED NANOSTRUCTURE

(71) Applicant: KOREA INSTITUTE OF SCIENCE AND TECHNOLOGY, Seoul (KR)

(72) Inventors: Chulki Kim, Samcheok-si (KR); Jae Hun Kim, Seoul (KR); Byeong Ho Park, Bucheon-si (KR); Seok Lee, Seoul (KR); Seong Chan Jun, Seoul (KR); Taikjin Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 182 days.

(21) Appl. No.: 14/185,419

(22) Filed: Feb. 20, 2014

(65) Prior Publication Data

US 2015/0131134 A1    May 14, 2015

(30) Foreign Application Priority Data

Nov. 11, 2013    (KR) .......................... 10-2013-0136279

(51) Int. Cl.
*G02F 3/00*         (2006.01)
*B82Y 10/00*        (2011.01)
(Continued)

(52) U.S. Cl.
CPC ................ *G02F 3/00* (2013.01); *B82Y 10/00* (2013.01); *B82Y 20/00* (2013.01); *G02B 27/286* (2013.01);
(Continued)

(58) Field of Classification Search
CPC .... G02B 5/3033; G02B 5/3083; G02B 5/305; G02B 27/283; G02B 27/286;
(Continued)

(56) References Cited

U.S. PATENT DOCUMENTS 4,630,898 A * 12/1986 Jewell ....................... G02F 3/00
                                                          359/243
6,167,170 A * 12/2000 Boffi ...................... G02F 1/0338
                                                           385/11
(Continued)

FOREIGN PATENT DOCUMENTS

JP          06-010705 B2    2/1994
JP          2000-241292 A    9/2000
(Continued)

OTHER PUBLICATIONS

English translation of JP 2001-33842, machine translated on Nov. 10, 2015.*

(Continued)

*Primary Examiner* — Jie Lei
(74) *Attorney, Agent, or Firm* — NSIP Law

(57) ABSTRACT

An optical logic gate includes: a DNA based nanostructure including DNA and metal nanoparticles coupled to the DNA, the DNA based nanostructure being configured to rotate a polarization plane of an incident light; a polarizer to which light passing through the DNA based nanostructure is incident, the polarizer being configured to extract a component in a direction of a predetermined reference axis from light whose polarization plane is rotated by the DNA based nanostructure; and a detection unit to which light passing through the polarizer is incident, the detection unit being configured to generate a logic signal based on a result obtained by comparing the intensity of the component in the reference axis direction extracted by the polarizer with a predetermined threshold value.

16 Claims, 8 Drawing Sheets

(51) Int. Cl.
*B82Y 20/00* (2011.01)
*G02B 27/28* (2006.01)

(52) U.S. Cl.
CPC ...... *G02F 2202/36* (2013.01); *G02F 2203/07* (2013.01); *Y10S 977/941* (2013.01)

(58) Field of Classification Search
CPC .. G01N 21/6428; G01N 21/658; G01N 31/22; G01N 33/54373; G01N 33/582; G02F 3/00; G02F 1/03; G02F 2203/07; G02F 2202/36; B82Y 10/00; B82Y 20/00; B29D 11/0073; C09K 19/544; F21V 9/14; Y10S 977/941
USPC .............. 359/107, 108, 251, 483.01, 487.01, 359/487.02, 487.06, 489.01, 489.07; 436/164, 171, 172, 805; 435/288.7, 808; 257/202, 204, 221; 252/299.01, 585; 362/19
See application file for complete search history.

(56) References Cited

U.S. PATENT DOCUMENTS

| | | |
|---|---|---|
| 2002/0054404 A1 | 5/2002 | Hedekvist et al. |
| 2005/0231855 A1* | 10/2005 | Tran ................ B82Y 10/00 360/324.1 |
| 2007/0297034 A1 | 12/2007 | Zaghloul et al. |
| 2009/0190196 A1 | 7/2009 | Zaghloul et al. |
| 2012/0127550 A1 | 5/2012 | Zaghloul et al. |

FOREIGN PATENT DOCUMENTS

| | | |
|---|---|---|
| JP | 2001-033842 A | 2/2001 |
| KR | 10-2012-0078058 A | 7/2012 |

OTHER PUBLICATIONS

Keller, Ursula, et al. "Semiconductor saturable absorber mirrors (SESAM's) for femtosecond to nanosecond pulse generation in solid-state lasers," *IEEE Journal of Selected Topics in Quantum Electronics*, vol. 2, No. 3, (Sep. 1996), pp. 435-453.

Schmidt, Andreas, et al. "Passive mode locking of Yb: KLuW using a single-walled carbon nanotube saturable absorber," *Optics letters*, vol. 33, No. 7 (Apr. 1, 2008), pp. 729-731.

Bao, Qiaoliang, et al. "Atomic-Layer Graphene as a Saturable Absorber for Ultrafast Pulsed Lasers," *Advanced Functional Materials*, vol. 19, No. 19 (2009), pp. 3077-3083.

Kuzyk, Anton, et al. "DNA-based self-assembly of chiral plasmonic nanostructures with tailored optical response," *Nature*, vol. 483, No. 7389, (Mar. 15, 2012) pp. 311-314.

* cited by examiner

OPTICAL LOGIC GATES AND METHOD FOR GENERATING LOGIC SIGNALS USING DNA-BASED NANOSTRUCTURE

CROSS-REFERENCE TO RELATED APPLICATION

This application claims priority to Korean Patent Application No. 10-2013-0136279, filed on Nov. 11, 2013, and all the benefits accruing therefrom under 35 U.S.C. §119, the contents of which in its entirety are herein incorporated by reference.

BACKGROUND

1. Field

Embodiments relate to optical logic gates and a method for generating logic signals using a DNA based nanostructure.

2. Description of the Related Art

A logic circuit (for example, NOT, AND, OR, or the like) refers to a circuit having a function of logically processing numerical information and generating an output. Until now, the logic circuit has been generally implemented based a semiconductor. However, the conventional semiconductor based information processing technique has recently reached the physical limit in its processing rate and degree of integration.

In order to overcome the limit of an available speed of the semiconductor based information processing technique, the information processing technique using light is considered as an alternative. A conventional light based logic circuit uses a non-linear optical characteristic of an optical element. However, in order to implement a non-linear characteristic of general optical elements, light with great intensity is required, which becomes an obstacle in applying the non-linear optical technique to a logic circuit.

Another alternative of the logic circuit configuration using optical signals is a technique of giving a logic value to a polarization state of light and processing signals through polarization plane control. This method based on the polarization state controlling technique may give a logic circuit using a low-power signal while maintaining the advantage of a rapid processing rate of the optical signal. Generally, a polarization plane of an optical signal is controlled using a wave plate. A phase difference is generated between polarization states due to birefringence of the wave plate, and accordingly, the polarization plane of the transmitting light is rotated. However, this wave plate has problems of difficult characteristic control according to wavelengths, difficult in miniaturization and integration, and high production costs.

SUMMARY

An aspect of the present disclosure is directed to providing optical logic gates and a method for generating logic signals, implemented using a DNA based nanostructure in which metal nanoparticles are combined.

According to an embodiment, an optical logic gate includes: a DNA based nanostructure including DNA and metal nanoparticles coupled to the DNA, the DNA based nanostructure being configured to rotate a polarization plane of an incident light; a polarizer to which light passing through the DNA based nanostructure is incident, the polarizer being configured to extract a component in a predetermined reference axis direction from light whose polarization plane is rotated by the DNA based nanostructure; and a detection unit to which light passing through the polarizer is incident, the detection unit being configured to generate a logic signal based on a result obtained by comparing the intensity of the component in the reference axis direction extracted by the polarizer with a predetermined threshold value.

In an embodiment, the predetermined threshold value may be determined by a saturable absorber of the detection unit.

According to another embodiment, a method for generating logic signals includes; inputting light to a DNA based nanostructure including DNA and metal nanoparticles coupled to the DNA to rotate a polarization plane of the incident light; inputting light whose polarization plane is rotated by the DNA based nanostructure to a polarizer to extract a component in a direction of a predetermined reference axis from the light with the rotated polarization plane; and generating a logic signal based on a result obtained by comparing the intensity of the component in the direction of the reference axis extracted by the polarizer with a predetermined threshold value.

In an embodiment, the predetermined threshold value may be determined by a saturable absorber configured to absorb light while allowing light over a saturation point to pass through.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown An optical logic gate according to embodiments disclosed in this specification use a light polarization state as an information delivery medium and is implemented using a polarization plane rotation characteristic of a DNA based nanostructure. In addition, the optical logic gate may be implemented using a transmission characteristic of a saturable absorber according to the intensity of light. The optical logic gate generates a logic signal based on the intensity of light passing through the saturable absorber, and in detail, the logic signal may be determined by comparing the intensity of a component in a specific reference axis direction, which changes according to the degree of rotation of the polarization plane of light, with a predetermined reference value. In an embodiment, the optical logic gate may be configured to allow consecutive logic calculation by applying a stepped computation scheme to generate a logic signal.

According to embodiments, by means of a polarization light control technique using a DNA based nanostructure, a logic circuit using light of a small intensity may be configured, different from non-linear optical elements. In other words, operations may be performed regardless of the intensity of light by endowing a logic value to a polarization state of an input light and obtaining a result through a polarization state after logic calculation using the polarization plane control.

Hereinafter, the configuration of the optical logic gate according to embodiments will be described in detail.

Figure 1:
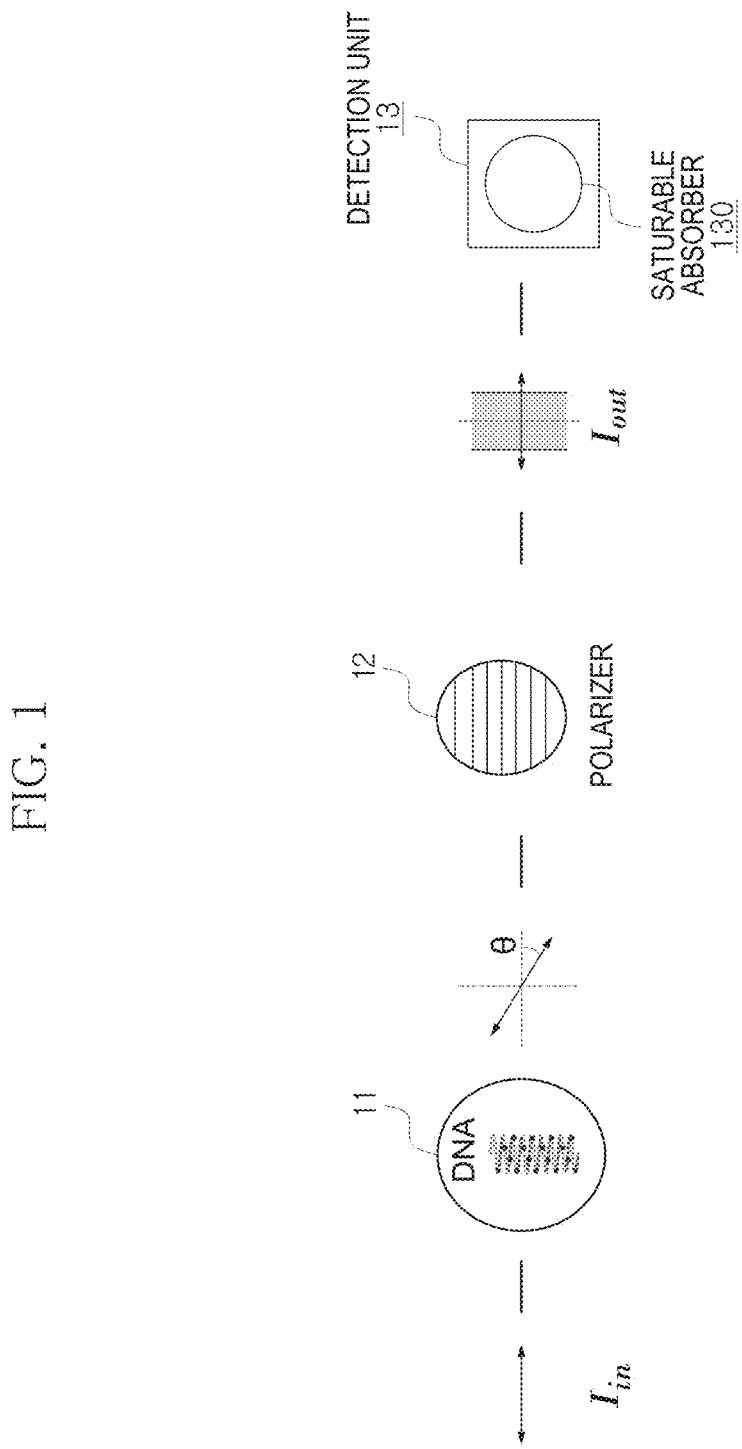
FIG. 1 is a schematic diagram showing an optical logic gate according to an embodiment.

FIG. 1 is a schematic diagram showing an optical logic gate according to an embodiment.

Referring to FIG. 1, an optical logic gate of this embodiment may include a DNA based nanostructure 11, a polarizer 12 and a detection unit 13. The optical logic gate may be configured to rotate a polarization plane of light ($I_{in}$) incident to the DNA based nanostructure 11 by the DNA based nanostructure 11, to extract and output only a component in a specific reference axis direction from the light having the rotated polarization plane by the polarizer 12, and to generate a logic signal from the detection unit 13 by using the intensity of light ($I_{out}$) output from the polarizer 12. For example, in an embodiment, the logic signal generated by the detection unit 13 may be 0 or 1 which is a binary signal.

Figure 2:
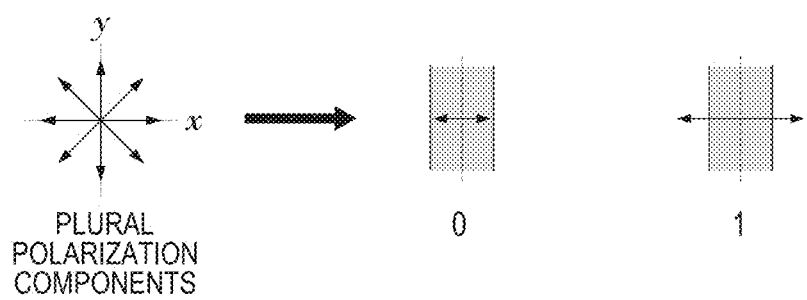
FIG. 2 is a diagram for illustrating a principle of determining a binary signal using a polarization direction.

FIG. 2 is a diagram for illustrating a principle of determining a binary signal using a polarization direction.

Referring to FIG. 2, light generally includes a plurality of polarization components therein and is determined as a single polarization light by a vector sum. The optical logic gate according to embodiments is configured to generate a logic signal based on the intensity of light in a specific reference axis direction, among the lights having a plurality of polarizations. For example, if the intensity of light in a reference axis direction is equal to or greater than a predetermined reference value, a corresponding logic signal of 1 is generated. And, if the intensity of light in the reference axis direction is smaller than the reference value, a corresponding logic signal of 0 may be generated.

Referring back to FIG. 1, the DNA based nanostructure 11 refers to a nanostructure in which at least one metal nanoparticle is coupled to DNA. The DNA based nanostructure 11 may be disposed at a sample (not shown) with a predetermined density. For example, the DNA based nanostructure 11 may be dispersed in a liquid sample such as a buffer solution or water or may be fixed to a solid sample such as a substrate. As well known in the art, DNA has a double helix structure, and the metal nanoparticle may be coupled to at least one spot of such a helix.

DNA obtained from a living body generally has a diameter of about 2 nm and a length of about up to 2 m, but its structure and chemical characteristic may be adjusted artificially. The metal nanoparticles may be made of material which easily causes a plasmonic phenomenon, introduced later. For example, gold (Au) or silver (Ag) may be used for the metal nanoparticles. The metal nanoparticles absorb light of different wavelengths according to their sizes and kinds. In an embodiment, the metal nanoparticles may have a size of about 3 to 10 nm. The chemical characteristic of DNA is artificially adjusted so that metal particles are adhered to specific spots. To rotate the polarization light, metal particles should be adhered to DNA along the helix structure of the DNA, and an unprecedented phenomenon occurs through a three-dimensional regular arrangement.

The DNA based nanostructure 11 is known to form an absorption spectrum in a visible region by a plasmonic resonance phenomenon among metal nanoparticles. In addition, the absorption spectrum varies according to a rotating direction of the metal nanoparticles coupled to DNA and a rotating direction of the incident circular polarization light. Due to different absorption degrees according to the circular polarization light rotating direction, compared with the light ($I_{in}$) incident to the DNA based nanostructure 11, the light passing through DNA based nanostructure 11 has a rotated polarization plane.

Figure 3:
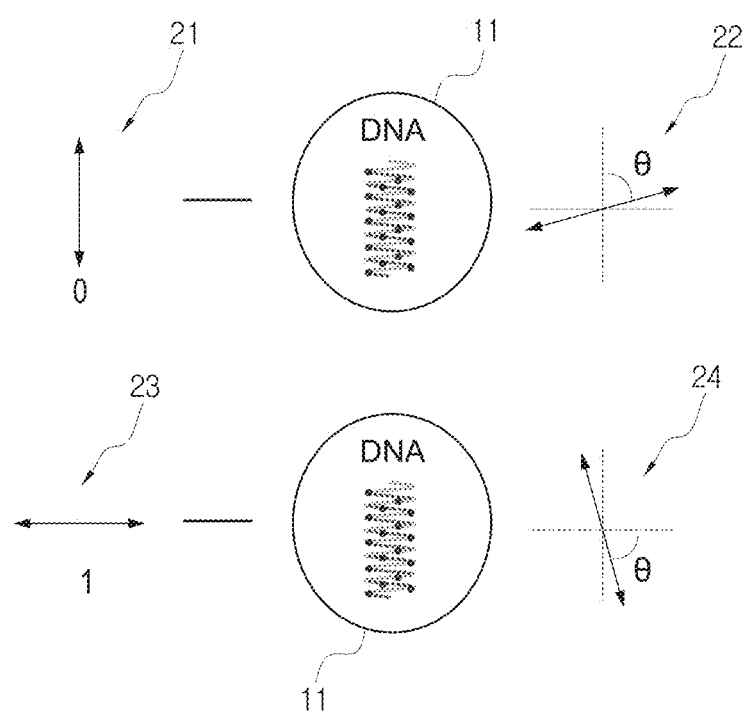
FIG. 3 is a diagram showing a polarization rotation characteristic of a DNA nanostructure.

FIG. 3 is a diagram showing a polarization rotation characteristic of a DNA nanostructure.

Referring to FIG. 3, if a polarized light is incident, the DNA based nanostructure 11 rotates the polarization plane of the incident light as much as an angle θ. For example, a light 21 having a vertical polarization may pass through the DNA based nanostructure 11 in the form of a light 22 whose polarization plane is rotated much as an angle θ by the DNA based nanostructure 11. In addition, a light 23 having a horizontal polarization may pass through the DNA based nanostructure 11 in the form of a light 24 whose polarization plane is rotated much as an angle θ by the DNA based nanostructure 11.

In embodiments of the present disclosure, the process of processing and generating a logic signal will be described on the assumption that the light 21 having a vertical polarization corresponds to a binary signal of 1 and the light 23 having a horizontal polarization has a value smaller than a threshold value with respect to the reference axis and corresponds to a binary signal of 0. However, this is just an example, and in other embodiments, the logic signal and a polarization direction of an optical signal corresponding thereto may be set differently.

The rotation angle θ of the polarization plane by the DNA based nanostructure 11 is influenced by the kind or length of DNA of the DNA based nanostructure 11 (for example, sequence, rotating direction of a helix of DNA, or the like), the kind or length of metal nanoparticles coupled to DNA, a distance among nanoparticles, or the like. In addition, if light passes through a plurality of DNAs while passing through the DNA based nanostructure 11, the influence increases further. In other words, if the DNA based nanostructure 11 has a great concentration and thus the possibility of light passing through DNA increases, the rotation angle θ increases further. With the same concentration, if a distance between DNAs through which light passes is greater, the rotation angle may increase further. The rotation angle θ of the polarization plane of light by the DNA based nanostructure 11 may be expressed like Equation 1 below.

$$\theta \approx C dA = k \times C dA = F(a_1, a_2, a_3, \ldots) \times C dA \quad \text{Equation 1}$$

In Equation 1, C represents a concentration in a liquid sample or an area density in a solid sample of the DNA based nanostructure 11, d represents a distance for the light to pass through the DNA based nanostructure 11 (for example, a thickness of a sample), and A represents a sectional area of light passing through the DNA based nanostructure 11. k is a polarization effect constant according to a property of the DNA based nanostructure 11 and may be calculated by a predetermined function $F(a_1, a_2, a_3, \ldots)$ using the kind and size of metal nanoparticles, a distance among metal nanoparticles, the change of a structure formed by DNA and metal nanoparticles, the kind and length of DNA, or the like as variables ($a_1$, $a_2$, $a_3$ or the like).

Logic calculation of an optical signal input to the optical logic gate according to embodiments is performed by controlling a polarization state of the input light ($I_{in}$) by using the DNA based nanostructure 11, and this operation demands precise control of the polarization plane rotation angle. In embodiments, this is performed by controlling an absorption spectrum of each polarization state by adjusting the kind of metal nanoparticles coupled to DNA, a size of nanoparticles, a distance among nanoparticles, or the like. In other words, by adjusting the parameter relating to metal nanoparticles, the rotation angle of a polarization plane of the input light ($I_{in}$) passing through the DNA based nanostructure 11 according to each wavelength may be controlled.

According to know experiment results, the DNA based nanostructure 11 may rotate the polarization plane so that a rotation ratio [1°/mm] per unit concentration (1 g·cm$^{-3}$) of the DNA based nanostructure 11 is 100 (deg·dm$^{-1}$·g$^{-1}$·cm$^3$), which corresponds to about 10 times of the rotation degree observed at quartz. The optical logic gate of embodiments, implemented using the above characteristics of the DNA based nanostructure 11, helps to overcome the difficulties of conventional optical elements in aspect of miniaturization and integration of the polarization-controlled optical element technique.

Referring back to FIG. 1, the light whose polarization plane is rotated by the DNA based nanostructure 11 may be incident to the polarizer 12. The polarizer 12 may extract only a component in a predetermined reference axis direction (for example, in an x-axis direction) from the light incident to the polarizer 12 with the polarization plane rotated by the DNA based nanostructure. The extracted light may pass through the polarizer 12 as light ($I_{out}$).

In detail, the relation between the rotation angle θ of the polarization plane by the DNA based nanostructure 11 and the light ($I_{out}$) passing through the polarizer 12 may be expressed like Equation 2 below.

$$\begin{aligned} I_{out} &= \vec{I_{in}} \cdot \vec{i} \\ &= I_{in}\cos\theta = I_{in}\cos(k \times Cd) \\ &= I_{in}\cos(\mathcal{F}(a_1, a_2, \ldots a_i) \times Cd) \end{aligned} \quad \text{Equation 2}$$

The detection unit 13 may generate a logic signal by using the intensity of the light ($I_{out}$) passing through the polarizer 12. The detection unit 13 may include a saturable absorber 130 which absorbs light having an intensity lower than a specific saturation point and allows light having an intensity equal to or greater than the saturation point to pass through. In an embodiment, the saturable absorber 130 may be made of semiconductor material. For example, the saturable absorber 130 may be made of aluminum arsenide, aluminum gallium arsenide, gallium arsenide, graphene, carbon nanotubes, other suitable materials, or their combinations. If the intensity of the incident light is lower than the saturation point of the saturable absorber 130, the saturable absorber 130 of the detection unit 13 absorbs light to lower the intensity of an output light. But if the intensity of the incident light is equal to or greater than the saturation point, the transmission amount rapidly increases so that the logic signal becomes '1'. The stark difference of the ratio of an input value of light to an output value based on the saturation point is utilized to implement a binary logic signal.

Figure 4:
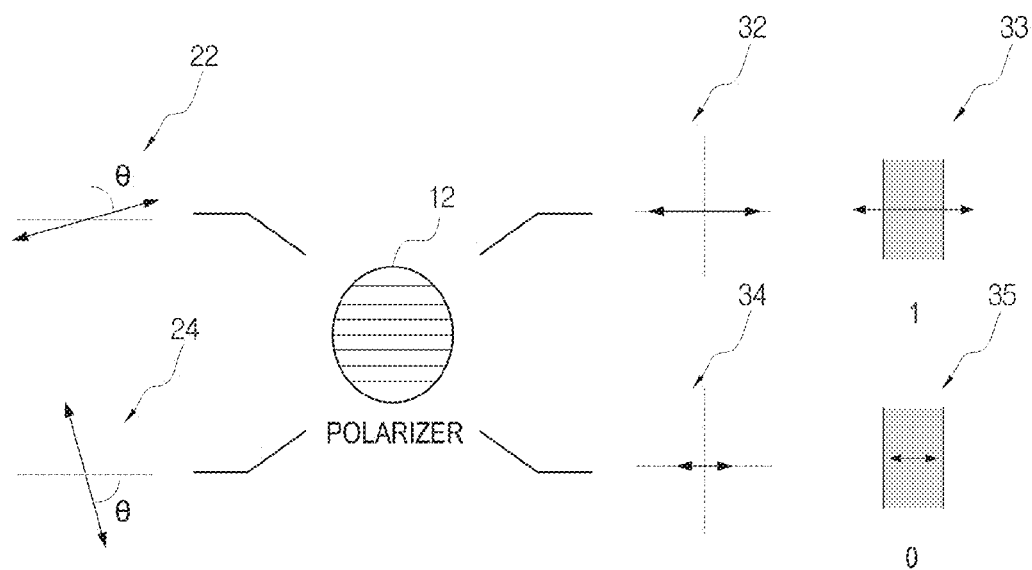
FIG. 4 is a diagram showing a result when light with a rotated polarization plane passes through a polarizer.

FIG. 4 is a diagram showing a result when light with a rotated polarization plane passes through a polarizer.

Referring to FIG. 4, the light 22, 24 with a rotated polarization plane is changed into light 32, 34 having only a component in a predetermined reference axis direction (for example, an x-axis direction) after passing through the polarizer 12. The detection unit 13 compares the light 32, 34 having the component in the reference axis direction by using the saturable absorber 130 with a reference value corresponding to a saturation point of the saturable absorber 130. If the light 34 having an intensity smaller than the saturation point of the saturable absorber 130 is incident to the saturable absorber 130, the light passing through the saturable absorber 130 has a very small intensity, and in this case, the detection unit 13 may generate a logic signal 35 (for example, a binary signal of 0) having a first value. Meanwhile, if the light 32 having an intensity equal to or greater than the saturation point of the saturable absorber 130 is incident to the saturable absorber 130, at least a part of the light passes through the saturable absorber 130, and in this case, the detection unit 13 may generate a logic signal 33 (for example, a binary signal of 1) having a second value different from the first value.

The saturable absorber 130 generally has a saturation point near transmittance of 98%, which however is different according to the material of the saturable absorber 130. In addition, the spot of the saturation point may vary according to an incident light. Therefore, when implementing an optical logic gate, the reference value used for generating a logic signal by the detection unit 13 may be determined as a suitable value in consideration of a relation between the intensity of the light incident to the detection unit 13 and the saturation point of the saturable absorber 130 so that the intensity of the light 32, 34 passing through the polarizer 12, and further the direction of the polarization plane of the light 22, 24 incident to the polarizer 12 may be distinguished by the intensity of the light passing through the saturable absorber.

Figure 5:
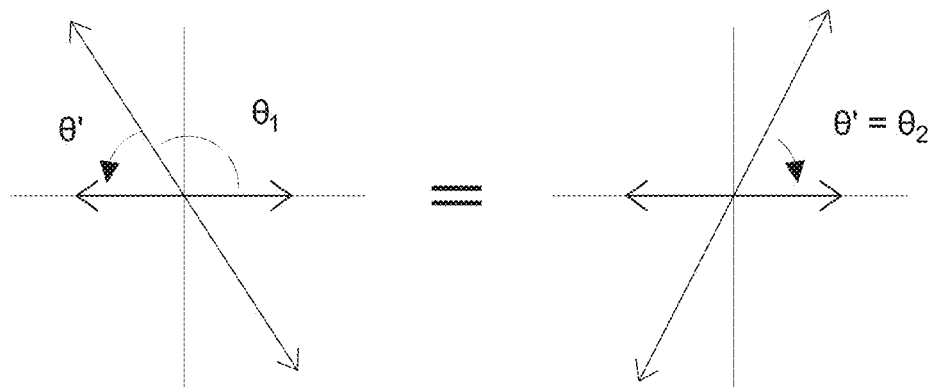
FIG. 5 is a diagram showing a relation between a rotation angle of a polarization and a linear polarization light extracted by the polarizer.

FIG. 5 is a diagram showing a relation between a rotation angle of a polarization light and a linear polarization light extracted by the polarizer.

In the optical logic gate according to embodiments, only an intensity element of light in the reference axis direction (for example, in the x-axis direction $\vec{i}$) may be taken by means of a vector dot product, which is implemented using the polarizer. Meanwhile, if the angle θ of the polarization plane rotated by the DNA based nanostructure is 90° or above, a dot product with $\vec{i}$ is not an angle between the vector representing the direction of the polarization plane and the reference axis. As shown in FIG. 5, when the polarization plane rotates by an angle $θ_1$ equal to or greater than 90°, the above vector dot product is identical to a vector dot product when the polarization plane rotates by an angle $θ_2$ which is smaller than 90° and has a value of 180-$θ_1$. Therefore, in an embodiment, the rotation angle of the polarization plane by the DNA based nanostructure may be 0° to 90°, and this setting may include all effects obtained by rotation beyond the above range.

By applying the basic principle described above, a logic circuit such as NOT, AND, OR, or the like may be implemented by the optical logic gate according to embodiments.

Figure 6:
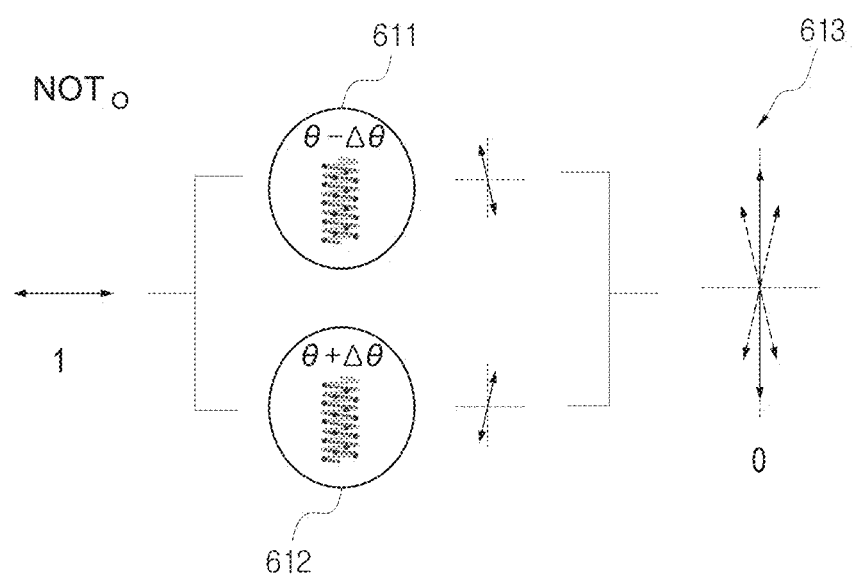
FIG. 6 is a schematic diagram showing a NOT logic circuit serving as an optical logic gate according to an embodiment.

FIG. 6 is a schematic diagram showing a NOT logic circuit serving as an optical logic gate according to an embodiment.

Referring to FIG. 6, the optical logic gate of this embodiment may include a first DNA based nanostructure 611 and a second DNA based nanostructure 612. The optical logic gate may further include a polarizer and a detection unit, which however are not depicted or explained since they are identical to the corresponding components of the optical logic gate of the embodiment described above with reference to FIG. 1. In the embodiment of FIG. 6, the incident light is divided into two lights of the same intensity and respectively incident to the first DNA based nanostructure 611 and the second DNA based nanostructure 612. In an embodiment, the optical logic gate may further include a light splitter (not shown) for this purpose.

The first DNA based nanostructure 611 and the second DNA based nanostructure 612 have different polarization plane rotation characteristics. The rotation angle by the first DNA based nanostructure 611 may be obtained by subtracting an adjustment angle $\Delta\theta$ from a predetermined reference angle $\theta$. Meanwhile, the rotation angle of the second DNA based nanostructure 612 may be obtained by adding the adjustment angle $\Delta\theta$ to the reference angle $\theta$. For example, the first DNA based nanostructure 611 may have a rotation characteristic for rotating the incident by an angle of $\theta-\Delta\theta$, and the second DNA based nanostructure 612 may have a rotation characteristic of rotating the incident light by an angle of $\theta+\Delta\theta$. Herein, the rotating directions of the polarization plane by the first DNA based nanostructure 611 and the second DNA based nanostructure 612 may be identical to each other. In order to implement a NOT logic circuit, the predetermined angle $\theta$ may be determined to be 90° or near. As $\theta$ approximates to 90°, the signal change of the NOT circuit is more ensured. The lights respectively passing through the first DNA based nanostructure 611 and the second DNA based nanostructure 612 are united together while moving along optical paths.

It is assumed that light having horizontal polarization corresponding to a binary signal of 1 is incident to the optical logic gate. At this time, the light incident to the first DNA based nanostructure 611 may rotate its polarization plane by an angle of $90°-\Delta\theta$ by the first DNA based nanostructure 611. Meanwhile, the light incident to the second DNA based nanostructure 612 may rotate its polarization plane by an angle of $90°\pm\Delta\theta$ by the second DNA based nanostructure 612. If the lights respectively passing through the first DNA based nanostructure 611 and the second DNA based nanostructure 612 are united, the direction of the polarization plane converges to about 90°. If the intensity of light in the x-axis direction serving as the reference axis is extracted therefrom, the light has an intensity of smaller than the saturation point of the saturable absorber. Therefore, in this case, the logic signal generated by the detection unit becomes 0. Therefore, a NOT circuit for shifting a binary signal of 1 into 0 may be implemented. If the binary signal of the incident light is 0, the operation will be opposite to the above.

In the above optical logic gate, since light continuously passes even though its intensity is small, the continuity of signal delivery to a next circuit is maintained. By dividing the incident light into two lights, adjusting their polarization planes and then uniting the lights into a single light, it is possible to enhance the stability in comparison to a signal shifting method using a single input signal, and the divided lights may be connected to another circuit and utilized again.

Figure 7:
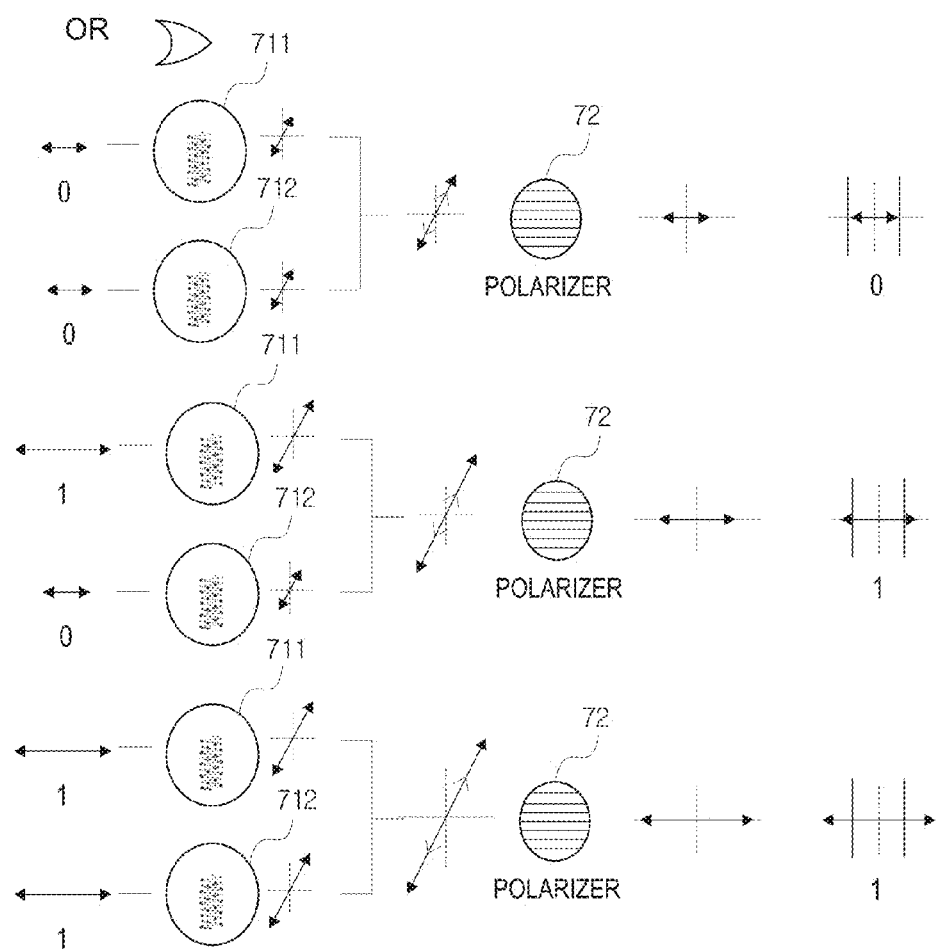
FIG. 7 is a schematic diagram showing an OR logic circuit serving as an optical logic gate according to an embodiment.

FIG. 7 is a schematic diagram showing an OR logic circuit serving as an optical logic gate according to an embodiment.

The optical logic gate of this embodiment may include a first DNA based nanostructure 711 and a second DNA based nanostructure 712. The first DNA based nanostructure 711 and the second DNA based nanostructure 712 respectively correspond to the first DNA based nanostructure 611 and the second DNA based nanostructure 612, described above with reference to FIG. 6, except for the rotation angle of the polarization plane. Similar to the former embodiment described above with reference to FIG. 6, the rotation angle by the first DNA based nanostructure 711 may be obtained by subtracting the adjustment angle from the predetermined reference angle (namely, $\theta-\Delta\theta$), and the rotation angle by the second DNA based nanostructure 712 may be obtained by adding the adjustment angle to the reference angle (namely, $\theta+\Delta\theta$).

In order to implement the OR logic circuit, regarding the rotation angles of the polarization planes by the first DNA based nanostructure 711 and the second DNA based nanostructure 712, when any one of lights incident to two nanostructures has a signal representing a binary signal of 1, the light passing through both nanostructures should correspond to a final signal of 1. For this, the reference angle for the rotated polarization plane by the first DNA based nanostructure 711 and the second DNA based nanostructure 712 may be determined as suitable values by using a function relation between the saturation point of the saturable absorber and the intensity of light in order to implement the OR logic circuit.

In detail, if both lights incident to the first DNA based nanostructure 711 and the second DNA based nanostructure 712 have a binary signal of 0, the lights with the polarization planes rotated by the first DNA based nanostructure 711 and the second DNA based nanostructure 712 may be united, and then the reference angle of the polarization plane rotation by the first DNA based nanostructure 711 and the second DNA based nanostructure 712 may be determined so that the intensity of light passing through the polarizer 72 does not exceed the saturation point of the saturable absorber. Meanwhile, if the light incident to any one or both of the first DNA based nanostructure 711 and the second DNA based nanostructure 712 has a binary signal of 1, the lights with the polarization planes respectively rotated by the first DNA based nanostructure 711 and the second DNA based nanostructure 712 may be united, and then the reference angle of the polarization plane rotation by the first DNA based nanostructure 711 and the second DNA based nanostructure 712 may be determined so that the intensity of light passing through the polarizer 72 exceeds the saturation point of the saturable absorber.

Figure 8:
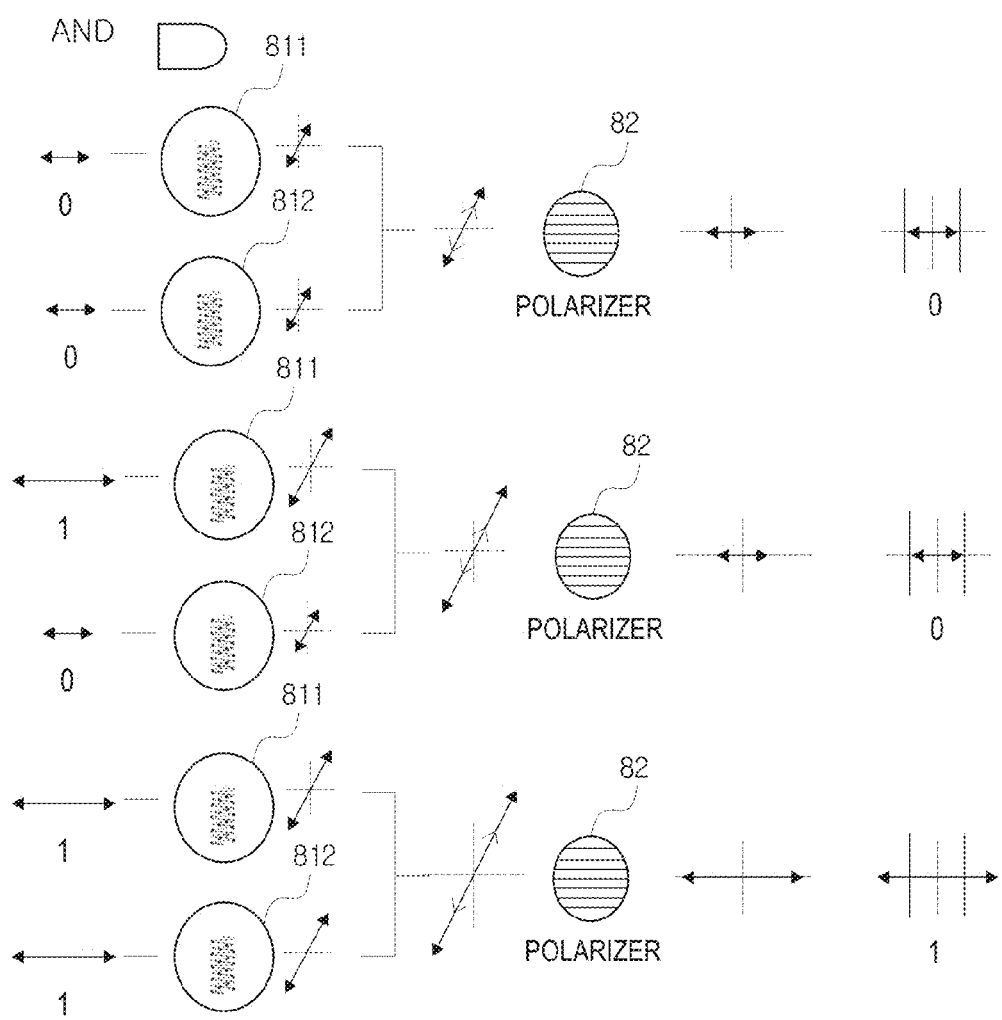
FIG. 8 is a schematic diagram showing an AND logic circuit serving as an optical logic gate according to an embodiment.

FIG. 8 is a schematic diagram showing an AND logic circuit serving as an optical logic gate according to an embodiment.

The optical logic gate of this embodiment may include a first DNA based nanostructure 811 and a second DNA based nanostructure 812. The first DNA based nanostructure 811 and the second DNA based nanostructure 812 are configured to respectively correspond to the first DNA based nanostructure 711 and the second DNA based nanostructure 712 described above with reference to FIG. 7. In other words, the rotation angle by the first DNA based nanostructure 811 may be obtained by subtracting the adjustment angle from the predetermined reference angle (namely, $\theta-\Delta\theta$), and the rotation angle by the second DNA based nanostructure 812 may be obtained by adding the adjustment angle to the reference angle (namely, $\theta+\Delta\theta$).

However, this embodiment is different from the embodiment of FIG. 7 only in the point that the reference angle of the polarization plane rotation by the first DNA based nanostructure 811 and the second DNA based nanostructure 812 are determined to implement an AND logic circuit. In other words, if any one or both of the lights incident to the first DNA based nanostructure 811 and the second DNA based nanostructure 812 has a binary signal of 0, the lights with the polarization planes respectively rotated by the DNA based nanostructure 811 and the second DNA based nanostructure 812 are united, and then the reference angle of the polarization plane rotation by the first DNA based nanostructure 811 and the second DNA based nanostructure 812 may be determined so that the intensity of light passing through the polarizer 82 does not exceed the saturation point of the saturable absorber. Meanwhile, if the lights incident to the first DNA based nanostructure 811 and the second DNA based nanostructure 812 have a binary signal of 1, the reference angle of the polarization plane rotation by the first DNA based nanostructure 811 and the second DNA based nanostructure 812 may be determined so that the intensity of light passing through the polarizer 82 exceeds the saturation point of the saturable absorber after the lights with the polarization planes rotated by the DNA based nanostructure 811 and the second DNA based nanostructure 812 are united.

By using the above principle, an optical logic gate may be designed based on a saturation point corresponding to an absorption limit by the saturable absorber by using a function relation between the rotation angle of the polarization plane by the DNA based nanostructure and the intensity of light passing through optical elements. The optical logic gate configured according to the above embodiments may perform optical logic calculation using light with a small intensity, and thus the advantage of rapid information processing of the optical calculation may be realized with a low power. Therefore, this is expected to be a low-power information processing technique which is advantageous in aspect of energy efficiency demanded by modern cutting-edge technologies first of all.

The optical logic gates and the method for generating logic signals using a DNA based nanostructure according to the embodiments of the present disclosure may realize optical logic calculation using light with a low intensity by configuring a logic circuit based on a polarization plane rotation characteristic thereof. Therefore, the advantage of rapid information processing of the optical calculation may be realized with a low power, and this is expected to be a low-power information processing technique which is advantageous in aspect of energy efficiency which is critically demanded in modem cutting-edge technologies. Moreover, since circuit elements may be designed very small in a level of $10^{-9}$ m, the optical logic gate may allow miniaturization and integration comparable to a computer semiconductor element currently used as a nanostructure-based element.

Though the present disclosure has been described with reference to the embodiments depicted in the drawings, it is just an example, and it should be understood by those skilled in the art that various modifications and equivalents can be made from the disclosure. However, such modifications should be regarded as being within the scope of the present disclosure. Therefore, the true scope of the present disclosure should be defined by the appended claims.

What is claimed is:

1. An optical logic gate, comprising:
   a DNA-based nanostructure comprising DNA and metal nanoparticles coupled to the DNA, and configured to rotate a polarization plane of an incident light, wherein a rotation angle ($\theta$) of the polarization plane is greater than 0 degrees and less than 90 degrees, and wherein the rotation angle ($\theta$) of the polarization plane by the DNA-based nanostructure is influenced by:
   a kind, length, sequence, or rotating direction of a helix of the DNA of the DNA-based nanostructure,
   a kind, length, or distance between metal nanoparticles coupled to the DNA of the DNA-based nanostructure, or
   a combination thereof;
   a polarizer disposed incident to light passing through the DNA-based nanostructure, and configured to extract a component of light in a direction of a predetermined reference axis, from light having a polarization plane rotated by the DNA-based nanostructure; and
   a detection unit disposed incident to light passing through the polarizer, and configured to generate a logic signal based on a result obtained by comparing the intensity of the component of light in the direction of the reference axis extracted by the polarizer with a predetermined threshold value,
   wherein the rotation angle ($\theta$) of the polarization plane of light by the DNA-based nanostructure is expressed by the following equation:

$$\theta = k \times CdA,$$

wherein C represents a concentration in a liquid sample, or an area density in a solid sample, of the DNA-based nanostructure,
   wherein d represents a distance for the light to pass through the DNA-based nanostructure,
   wherein A represents a sectional area of light passing through the DNA-based nanostructure, and
   wherein k is a polarization effect constant according to a property of the DNA-based nanostructure.

2. The optical logic gate according to claim 1,
   wherein the detection unit comprises a saturable absorber configured to absorb light having an intensity lower than a threshold value, and to allow light having an intensity equal to or greater than the threshold value to pass through, and
   wherein the threshold value is determined based on a saturation point of the saturable absorber.

3. The optical logic gate according to claim 2,
   wherein the saturable absorber comprises a semiconductor material.

4. The optical logic gate according to claim 3,
   wherein the saturable absorber comprises aluminum arsenide, aluminum gallium arsenide, gallium arsenide, graphene, or carbon nanotube.

5. The optical logic gate according to claim 1, wherein the detection unit is
   configured to determine a first value as the logic signal when the intensity of the component of light in the direction of the reference axis is equal to or greater than the threshold value, and
   configured to determine a second value, different from the first value, as the logic signal when the intensity of the component of light in the direction of the reference axis is less than the threshold value.

6. The optical logic gate according to claim 1,
   wherein the DNA-based nanostructure is configured to rotate a polarization plane of an incident light less than or equal to a predetermined angle, and
   wherein the predetermined angle is determined based on a length of a helix of DNA in the DNA-based nanostructure, a size of metal particles, a kind of the metal particles, or a combination thereof.

7. The optical logic gate according to claim 1,
   wherein the DNA-based nanostructure comprises a first DNA-based nanostructure and a second DNA-based nano structure, each having different polarization plane rotation characteristics from each other, wherein the rotation angle (θ) of the polarization plane by the first DNA-based nanostructure is obtained by subtracting a predetermined adjustment angle from a predetermined reference angle, and wherein the rotation angle (θ) of the polarization plane by the second DNA-based nanostructure is obtained by adding the adjustment angle to the reference angle.

8. The optical logic gate of claim 1, wherein the relationship between the rotation angle (θ) of the polarization plane of light ($I_{in}$) input to the DNA-based nanostructure, and light ($I_{out}$) output by the polarizer, is expressed by the following equation:

$$I_{out}=I_{in} \cdot \cos \theta.$$

9. The optical logic gate of claim 1, wherein the rotation angle (θ) of the polarization plane of light by the DNA-based nanostructure is expressed by the following equations:

$$\theta = k \times CdA = F(a_1, a_2, a_3, \ldots) \times CdA,$$

wherein k is calculated by using a predetermined function $F(a_1, a_2, a_3, \ldots)$, wherein $(a_1, a_2, a_3, \ldots)$ comprises:

the kind, length, sequence, or rotating direction of the helix of the DNA of the DNA-based nanostructure, the kind, length, or distance between the metal nanoparticles coupled to the DNA of the DNA-based nanostructure, or a combination thereof.

10. A method for generating logic signals, comprising:

inputting light to a DNA-based nanostructure to rotate a polarization plane of the incident light, the DNA-based nanostructure comprising DNA and metal nanoparticles coupled to the DNA, wherein a rotation angle (θ) of the polarization plane is greater than 0 degrees and less than 90 degrees, and wherein the rotation angle (θ) of the polarization plane by the DNA-based nanostructure is influenced by:

a kind, length, sequence, or rotating direction of a helix of the DNA of the DNA-based nanostructure, a kind, length, or distance between metal nanoparticles coupled to the DNA of the DNA-based nanostructure, or a combination thereof;

inputting light having a polarization plane rotated by the DNA-based nanostructure, to a polarizer to extract a component of light in a direction of a predetermined reference axis, from the light with the rotated polarization plane; and generating a logic signal based on a result obtained by comparing the intensity of the component of light in the direction of the reference axis extracted by the polarizer with a predetermined threshold value, wherein the rotation angle (θ) of the polarization plane of light by the DNA-based nanostructure is expressed by the following equation:

$$\theta = k \times CdA,$$

wherein C represents a concentration in a liquid sample, or an area density in a solid sample, of the DNA-based nanostructure, wherein d represents a distance for the light to pass through the DNA-based nanostructure, wherein A represents a sectional area of light passing through the DNA-based nanostructure, and wherein k is a polarization effect constant according to a property of the DNA-based nanostructure.

11. The method for generating logic signals according to claim 10, wherein generating the logic signal comprises:

inputting light passing through the polarizer to a saturable absorber, the saturable absorber configured to absorb light having an intensity lower than a threshold value, and to allow light having an intensity equal to or greater than the threshold value to pass through; and detecting the light passing through the saturable absorber, wherein the threshold value is determined based on a saturation point of the saturable absorber.

12. The method for generating logic signals according to claim 10, wherein the generating the logic signal comprises:

determining a first value as the logic signal when the intensity of the component of light in the direction of the reference axis is equal to or greater than the threshold value, and determining a second value different from the first value as the logic signal when the intensity of the component of light in the direction of the reference axis is less than the threshold value.

13. The method for generating logic signals according to claim 10, wherein, in rotating the polarization plane of the incident light, the rotation angle (θ) of the polarization plane is determined based on: a length of a helix of DNA in the DNA-based nanostructure, a size of metal particles, a kind of the metal particles, or a combination thereof.

14. The method for generating logic signals according to claim 10, wherein rotating the polarization plane of the incident light comprises:

inputting light to a first DNA-based nanostructure and a second DNA-based nanostructure having different polarization plane rotation characteristics, wherein the rotation angle (θ) of the polarization plane by the first DNA-based nanostructure is obtained by subtracting a predetermined adjustment angle from a predetermined reference angle, and wherein the rotation angle (θ) of the polarization plane by the second DNA-based nanostructure is obtained by adding the adjustment angle to the reference angle.

15. The method for generating logic signals according to claim 10, wherein the relationship between the rotation angle (θ) of the polarization plane of light ($I_{in}$) input to the DNA-based nanostructure, and light ($I_{out}$) output by the polarizer, is expressed by the following equation:

$$I_{out}=I_{in} \cdot \cos \theta.$$

16. The method for generating logic signals according to claim 10, wherein the rotation angle (θ) of the polarization plane of light by the DNA-based nanostructure is expressed by the following equations:

$$\theta = k \times CdA = F(a_1, a_2, a_3, \ldots) \times CdA,$$

wherein k is calculated by using a predetermined function $F(a_1, a_2, a_3, \ldots)$, wherein $(a_1, a_2, a_3, \ldots)$ comprises:

the kind, length, sequence, or rotating direction of the helix of the DNA of the DNA-based nanostructure, the kind, length, or distance between the metal nanoparticles coupled to the DNA of the DNA-based nanostructure, or a combination thereof.

* * * * *